(12) United States Patent
Bloch et al.

(10) Patent No.: US 9,792,026 B2
(45) Date of Patent: Oct. 17, 2017

(54) DYNAMIC TIMELINE FOR BRANCHED VIDEO

(71) Applicant: JBF Interlude 2009 LTD—Israel, Tel Aviv-Yafo (IL)

(72) Inventors: Jonathan Bloch, Brooklyn, NY (US); Barak Feldman, Tenafly, NJ (US); Tal Zubalsky, Tel Aviv-Yafo (IL); Yuval Hofshy, Kfar Saba (IL)

(73) Assignee: JBF Interlude 2009 LTD, Tel Aviv-Yafo (IE)

( * ) Notice: Subject to any disclaimer, the term of this patent is extended or adjusted under 35 U.S.C. 154(b) by 369 days.

(21) Appl. No.: 14/249,665

(22) Filed: Apr. 10, 2014

(65) Prior Publication Data

US 2015/0293675 A1    Oct. 15, 2015

(51) Int. Cl.
*G06F 3/048* (2013.01)
*G06F 3/0484* (2013.01)
*G11B 27/34* (2006.01)

(52) U.S. Cl.
CPC ...... *G06F 3/04847* (2013.01); *G06F 3/04842* (2013.01); *G11B 27/34* (2013.01)

(58) Field of Classification Search
CPC . G06F 3/048; H04N 7/16; H04N 7/10; H04N 7/025; G09G 5/00
See application file for complete search history.

(56) References Cited

U.S. PATENT DOCUMENTS

| | | |
|---|---|---|
| 4,569,026 A | 2/1986 | Best |
| 5,161,034 A | 11/1992 | Klappert |
| 5,568,602 A | 10/1996 | Callahan et al. |
| 5,607,356 A | 3/1997 | Schwartz |
| 5,636,036 A | 6/1997 | Ashbey |

(Continued)

FOREIGN PATENT DOCUMENTS

| | | |
|---|---|---|
| CA | 2639491 A1 | 3/2010 |
| DE | 004038801 A1 | 6/1992 |

(Continued)

OTHER PUBLICATIONS

An ffmpeg and SDL Tutorial, "Tutorial 05: Synching Video," Retrieved from internet on Mar. 15, 2013: <http://dranger.com/ffmpeq/tutorial05.html>, 4 pages.

(Continued)

*Primary Examiner* — Rashawn Tillery
(74) *Attorney, Agent, or Firm* — Goodwin Procter LLP

(57) ABSTRACT

Systems and methods for editing and controlling video playback using a dynamic timeline. The dynamic timeline allows a user to edit a video content structure that includes a plurality of video content paths, each video content path including a plurality of video content segments. The video content segments in a first video content path are visually represented on the dynamic timeline. A selection in the dynamic timeline is received that changes a first video content segment from the first video content path to a second video content segment in an alternative video content path in the video content structure. Subsequently, the dynamic timeline is updated to display visual representations of at least some of the video content segments in the alternative video content path.

16 Claims, 4 Drawing Sheets

(56) References Cited

U.S. PATENT DOCUMENTS

| | | | |
|---|---|---|---|
| 5,676,551 A * | 10/1997 | Knight | A63F 13/005 434/236 |
| 5,734,862 A | 3/1998 | Kulas | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,298,482 B1 | 10/2001 | Seidman et al. | |
| 6,728,477 B1 | 4/2004 | Watkins | |
| 6,801,947 B1 | 10/2004 | Li | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,669,128 B2 | 2/2010 | Bailey et al. | |
| 7,787,973 B2 | 8/2010 | Lambert | |
| 7,917,505 B2 | 3/2011 | van Gent et al. | |
| 8,024,762 B2 | 9/2011 | Britt | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,612,517 B1 | 12/2013 | Yadid et al. | |
| 8,650,489 B1 | 2/2014 | Baum et al. | |
| 8,826,337 B2 | 9/2014 | Issa et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,190,110 B2 | 11/2015 | Bloch | |
| 9,257,148 B2 * | 2/2016 | Bloch | G11B 27/11 |
| 9,268,774 B2 | 2/2016 | Kim et al. | |
| 9,271,015 B2 | 2/2016 | Bloch et al. | |
| 9,390,099 B1 | 7/2016 | Wang et al. | |
| 9,465,435 B1 | 10/2016 | Zhang et al. | |
| 9,641,898 B2 * | 5/2017 | Bloch | H04N 21/47217 |
| 9,672,868 B2 | 6/2017 | Bloch et al. | |
| 2002/0086724 A1 | 7/2002 | Miyaki et al. | |
| 2002/0091455 A1 | 7/2002 | Williams | |
| 2002/0105535 A1 * | 8/2002 | Wallace | G06F 3/0485 715/719 |
| 2002/0106191 A1 | 8/2002 | Betz et al. | |
| 2002/0120456 A1 | 8/2002 | Berg et al. | |
| 2002/0129374 A1 | 9/2002 | Freeman et al. | |
| 2002/0140719 A1 | 10/2002 | Amir et al. | |
| 2002/0177914 A1 | 11/2002 | Chase | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0172476 A1 | 9/2004 | Chapweske | |
| 2005/0019015 A1 | 1/2005 | Ackley et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0210145 A1 | 9/2005 | Kim et al. | |
| 2006/0024034 A1 | 2/2006 | Filo et al. | |
| 2006/0028951 A1 | 2/2006 | Tozun et al. | |
| 2006/0064733 A1 * | 3/2006 | Norton | G11B 19/025 725/135 |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0224260 A1 | 10/2006 | Hicken et al. | |
| 2007/0003149 A1 | 1/2007 | Nagumo et al. | |
| 2007/0024706 A1 | 2/2007 | Brannon et al. | |
| 2007/0033633 A1 | 2/2007 | Andrews et al. | |
| 2007/0099684 A1 | 5/2007 | Butterworth | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0239754 A1 | 10/2007 | Schnitman | |
| 2007/0253677 A1 | 11/2007 | Wang | |
| 2007/0263722 A1 | 11/2007 | Fukuzawa | |
| 2008/0019445 A1 | 1/2008 | Aono et al. | |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0148152 A1 | 6/2008 | Blinnikka et al. | |
| 2008/0170687 A1 | 7/2008 | Moors et al. | |
| 2008/0178232 A1 | 7/2008 | Velusamy | |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0116817 A1 | 5/2009 | Kim et al. | |
| 2009/0191971 A1 | 7/2009 | Avent | |
| 2009/0199697 A1 | 8/2009 | Lehtiniemi et al. | |
| 2009/0228572 A1 | 9/2009 | Wall et al. | |
| 2009/0258708 A1 | 10/2009 | Figueroa | |
| 2009/0265746 A1 | 10/2009 | Halen et al. | |
| 2009/0297118 A1 | 12/2009 | Fink et al. | |
| 2009/0320075 A1 | 12/2009 | Marko | |
| 2010/0017820 A1 | 1/2010 | Thevathasan et al. | |
| 2010/0042496 A1 * | 2/2010 | Wang | G06Q 10/087 705/14.49 |
| 2010/0077290 A1 | 3/2010 | Pueyo | |
| 2010/0088726 A1 | 4/2010 | Curtis et al. | |
| 2010/0146145 A1 | 6/2010 | Tippin et al. | |
| 2010/0153512 A1 | 6/2010 | Balassanian et al. | |
| 2010/0161792 A1 | 6/2010 | Palm et al. | |
| 2010/0167816 A1 | 7/2010 | Perlman et al. | |
| 2010/0186579 A1 | 7/2010 | Schnitman | |
| 2010/0210351 A1 | 8/2010 | Berman | |
| 2010/0262336 A1 | 10/2010 | Rivas et al. | |
| 2010/0267450 A1 | 10/2010 | McMain | |
| 2010/0268361 A1 | 10/2010 | Mantel et al. | |
| 2010/0278509 A1 | 11/2010 | Nagano et al. | |
| 2010/0287033 A1 | 11/2010 | Mathur | |
| 2010/0287475 A1 | 11/2010 | van Zwol et al. | |
| 2010/0293455 A1 | 11/2010 | Bloch | |
| 2010/0332404 A1 | 12/2010 | Valin | |
| 2011/0007797 A1 | 1/2011 | Palmer et al. | |
| 2011/0010742 A1 | 1/2011 | White | |
| 2011/0026898 A1 | 2/2011 | Lussier et al. | |
| 2011/0033167 A1 | 2/2011 | Arling et al. | |
| 2011/0096225 A1 | 4/2011 | Candelore | |
| 2011/0126106 A1 | 5/2011 | Ben Shaul et al. | |
| 2011/0131493 A1 * | 6/2011 | Dahl | G06F 17/30029 715/716 |
| 2011/0138331 A1 | 6/2011 | Pugsley et al. | |
| 2011/0163969 A1 | 7/2011 | Anzures et al. | |
| 2011/0191684 A1 | 8/2011 | Greenberg | |
| 2011/0197131 A1 * | 8/2011 | Duffin | G11B 27/34 715/720 |
| 2011/0200116 A1 | 8/2011 | Bloch et al. | |
| 2011/0202562 A1 | 8/2011 | Bloch et al. | |
| 2011/0246885 A1 | 10/2011 | Pantos et al. | |
| 2011/0252320 A1 | 10/2011 | Arrasvuori et al. | |
| 2011/0264755 A1 | 10/2011 | De Villiers | |

(56) References Cited

U.S. PATENT DOCUMENTS

| | | |
|---|---|---|
| 2011/0307786 A1 | 12/2011 | Shuster |
| 2012/0004960 A1 | 1/2012 | Ma et al. |
| 2012/0005287 A1 | 1/2012 | Gadel et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0110620 A1 | 5/2012 | Kilar et al. |
| 2012/0134646 A1 | 5/2012 | Alexander |
| 2012/0147954 A1 | 6/2012 | Kasai et al. |
| 2012/0179970 A1 | 7/2012 | Hayes |
| 2012/0198412 A1 | 8/2012 | Creighton et al. |
| 2012/0308206 A1 | 12/2012 | Kulas |
| 2013/0028573 A1 | 1/2013 | Hoofien et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1* | 4/2013 | Stone ............... A63F 13/10 725/61 |
| 2013/0125181 A1 | 5/2013 | Montemayor et al. |
| 2013/0129308 A1 | 5/2013 | Karn et al. |
| 2013/0177294 A1 | 7/2013 | Kennberg |
| 2013/0188923 A1 | 7/2013 | Hartley et al. |
| 2013/0204710 A1 | 8/2013 | Boland et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0308926 A1 | 11/2013 | Jang et al. |
| 2014/0019865 A1 | 1/2014 | Shah |
| 2014/0025839 A1 | 1/2014 | Marko et al. |
| 2014/0040280 A1 | 2/2014 | Slaney et al. |
| 2014/0078397 A1 | 3/2014 | Bloch et al. |
| 2014/0082666 A1* | 3/2014 | Bloch ............... G11B 27/34 725/37 |
| 2014/0094313 A1 | 4/2014 | Watson et al. |
| 2014/0101550 A1 | 4/2014 | Zises |
| 2014/0129618 A1 | 5/2014 | Panje et al. |
| 2014/0152564 A1 | 6/2014 | Gulezian et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0282013 A1 | 9/2014 | Amijee |
| 2014/0380167 A1* | 12/2014 | Bloch ............ H04N 21/4307 715/723 |
| 2015/0046946 A1 | 2/2015 | Hassell et al. |
| 2015/0058342 A1 | 2/2015 | Kim et al. |
| 2015/0067723 A1* | 3/2015 | Bloch ............ H04N 21/812 725/32 |
| 2015/0104155 A1 | 4/2015 | Bloch et al. |
| 2015/0179224 A1 | 6/2015 | Bloch et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1* | 7/2015 | Bloch ............... G11B 27/34 715/720 |
| 2015/0201187 A1 | 7/2015 | Ryo |
| 2015/0258454 A1 | 9/2015 | King et al. |
| 2015/0293675 A1 | 10/2015 | Bloch et al. |
| 2015/0294685 A1 | 10/2015 | Bloch et al. |
| 2016/0062540 A1 | 3/2016 | Yang et al. |
| 2016/0104513 A1* | 4/2016 | Bloch ............... G06F 3/0484 715/720 |
| 2016/0105724 A1 | 4/2016 | Bloch |
| 2016/0132203 A1 | 5/2016 | Seto et al. |
| 2016/0170948 A1 | 6/2016 | Bloch |
| 2016/0173944 A1 | 6/2016 | Kilar et al. |
| 2016/0217829 A1 | 7/2016 | Bloch |
| 2016/0224573 A1 | 8/2016 | Shahraray et al. |
| 2016/0322054 A1 | 11/2016 | Bloch |
| 2016/0323608 A1 | 11/2016 | Bloch |
| 2017/0062012 A1 | 3/2017 | Bloch |
| 2017/0178409 A1 | 6/2017 | Bloch |
| 2017/0178601 A1 | 6/2017 | Bloch |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2008005288 A | 1/2008 |
| KR | 20040005068 A | 1/2004 |
| KR | 20100037413 A | 4/2010 |
| WO | WO-96/13810 A1 | 5/1996 |
| WO | WO-00/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/137919 A1 | 11/2009 |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet: http://www.technipages.com/itunes-queue-next-song.html.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2010/000362 dated Aug. 25, 2010, 2 pages.
International Search Report for International Patent Application PCT/IL2012/000080 dated Aug. 9, 2012, 4 pages.
International Search Report for International Patent Application PCT/IL2012/000081 dated Jun. 28, 2012, 4 pages.
International Search Report and Writton Opinion for International Application PCT/IB2013/001000 dated Jul. 31, 2013, 12 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, pp. 1-8.
Sodagar, I., (2011) "The MPEG-DASH Standard for Multimedia Streaming Over the Internet", IEEE Multimedia, IEEE Service Center, New York, NY, US, vol. 18, No. 4, pp. 62-67.
Supplemental European Search Report for EP10774637.2 (PCT/IL2010/000362) dated Jun. 20, 2012, 6 pages.
Supplemental European Search Report for EP13184145 dated Jan. 30, 2014, 6 pages.
Yang, H, et al., "Time Stamp Synchronization in Video Systems," Teletronics Technology Corporation, <http://www.ttcdas.com/products/dausencoders/pdf/techpapers/tp2010timestampvideosystem.pdf>, Abstract, 8 pages.
U.S. Appl. No. 15/356,913, Systems and Methods for Real-Time Pixel Switching, filed Nov. 21, 2016.
U.S. Appl. No. 15/481,916, Systems and Methods for Creating Linear Video From Branched Video, filed Apr. 7, 2017.
U.S. Appl. No. 15/085,209, Media Stream Rate Synchronization, filed Mar. 30, 2016.
U.S. Appl. No. 15/165,373, Symbiotic Interactive Video, filed May 26, 2016.
U.S. Appl. No. 15/189,931, Dynamic Summary Generation for Real-time Switchable Videos, filed Jun. 22, 2016.
U.S. Appl. No. 15/395,477, Systems and Methods for Dynamic Weighting of Branched Video Paths, filed Dec. 30, 2016.

* cited by examiner

DYNAMIC TIMELINE FOR BRANCHED VIDEO

FIELD OF THE INVENTION

The present disclosure relates generally to video playback and editing and, more particularly, to systems and methods for providing a dynamic timeline for editing non-linear video content.

BACKGROUND

Existing video editing and post-production software products use a linear, static timeline to represent the progression of a video over time. The timeline is generally associated with a video that has a fixed duration, frame rate, and resolution. Accordingly, rendering the video after editing it results in the creation of a linear, non-interactive video. Branching, non-linear videos, however, cannot be edited using static timelines because such timelines are unable to accurately represent the various video paths that can be interactively traversed during the viewing of these videos. Linear, static timelines do not provide the ability for users to edit, structure, and manipulate multiple interrelated timelines that together result in a navigable, interactive experience.

SUMMARY

Systems and methods are presented for providing a dynamic timeline for editing and playing interactive, non-linear video. In one aspect, a dynamic timeline is provided which allows a user to edit a video content structure. The structure includes a plurality of video content paths, each video content path including a plurality of video content segments. The video content segments in a first video content path are visually represented on the dynamic timeline. A selection in the dynamic timeline is received that changes a first video content segment from the first video content path to a second video content segment in an alternative video content path in the video content structure. Subsequently, the dynamic timeline is updated to display visual representations of at least some of the video content segments in the alternative video content path.

In one implementation, the dynamic timeline further includes at least one visual indicator disposed at a branching point of a video content path. The visual indicator can identify a number of alternative video content segments that follow the branching point. The dynamic timeline can also include at least one visual indicator that delineates a decision period in a video content segment.

In another implementation, the dynamic timeline is updated by replacing the visual representations of the video content segments that follow the first video content segment in the first video content path with visual representations of the video content segments that follow the second video content segment in the alternative video content path.

In a further implementation, the dynamic timeline allows for the editing of properties associated with a particular video content segment.

In yet another implementation, a preview of an interactive video based on the video content structure is provided in response to a user interaction with the dynamic timeline. The dynamic timeline can then be updated based on a user interaction with the interactive video preview.

In another aspect, a dynamic timeline system allows a user to edit a video content structure. The structure includes a plurality of video content paths, each video content path including a plurality of video content segments. The video content segments in a first video content path are visually represented on the dynamic timeline. A selection in the dynamic timeline is received that changes a first video content segment from the first video content path to a second video content segment in an alternative video content path in the video content structure. Subsequently, the dynamic timeline is updated to display visual representations of at least some of the video content segments in the alternative video content path.

In one implementation, the dynamic timeline further includes at least one visual indicator disposed at a branching point of a video content path. The visual indicator can identify a number of alternative video content segments that follow the branching point. The dynamic timeline can also include at least one visual indicator that delineates a decision period in a video content segment.

In another implementation, the dynamic timeline is updated by replacing the visual representations of the video content segments that follow the first video content segment in the first video content path with visual representations of the video content segments that follow the second video content segment in the alternative video content path.

In a further implementation, the dynamic timeline allows for the editing of properties associated with a particular video content segment.

In yet another implementation, a preview of an interactive video based on the video content structure is provided in response to a user interaction with the dynamic timeline. The dynamic timeline can then be updated based on a user interaction with the interactive video preview.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
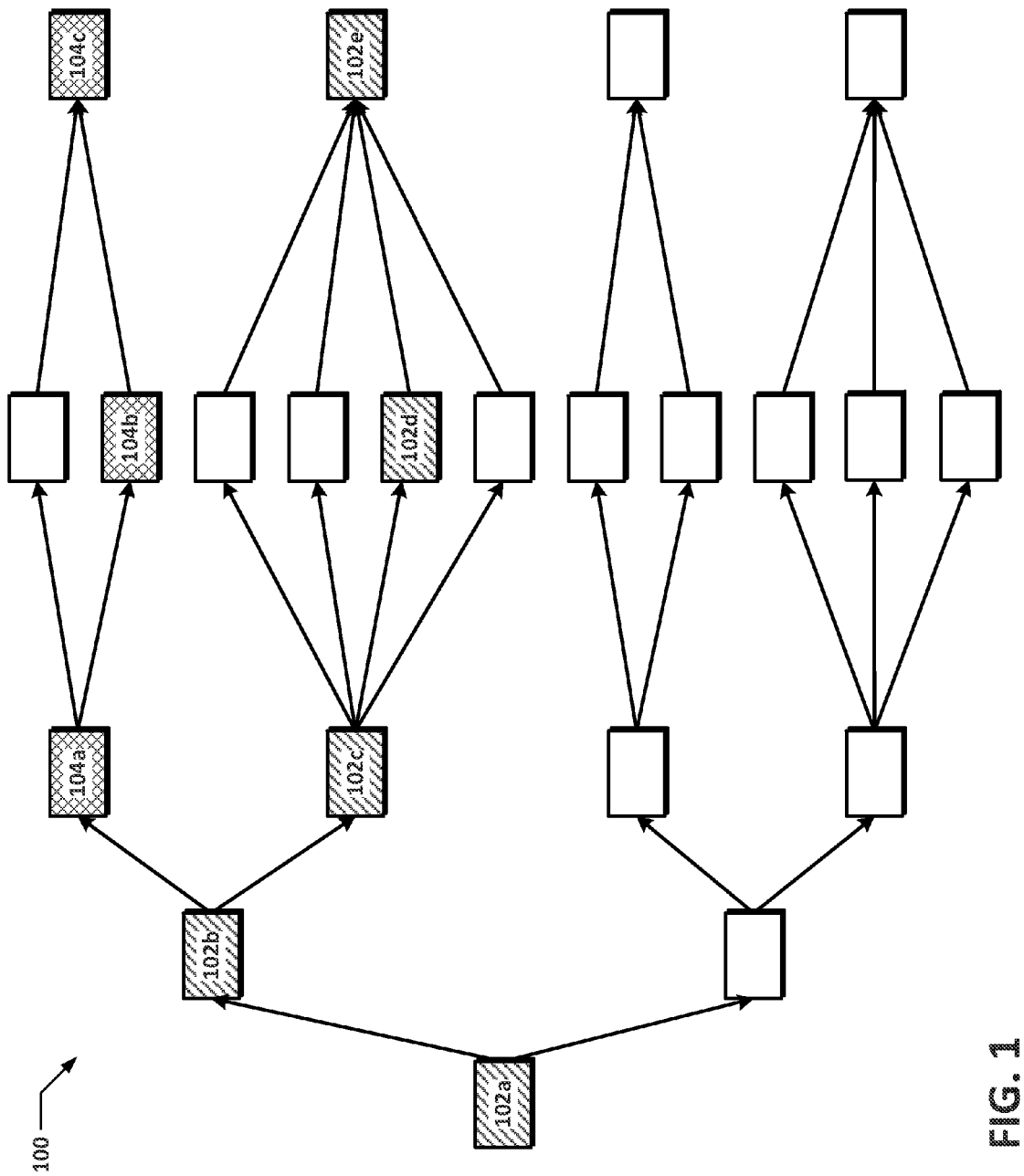
FIG. 1 is a diagram of an example video tree.

Described herein are various implementations of methods and supporting systems for editing a video tree using a dynamic timeline. In some implementations, the video tree is formed by nodes that are connected in a branching form, such as in the video tree 100 shown in FIG. 1. Nodes can have an associated video segment, audio segment, graphical user interface elements, and/or other associated media. Users (e.g., viewers) can watch a video that begins from a starting node in the tree and proceeds along connected nodes. Upon reaching a point where multiple video segments branch off from a currently viewed segment, the user can interactively select the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree can be selectably presentable multimedia content and can include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and there can be multiple paths that a user can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a countdown or other visual, aural, or other sensory indicator can be presented during playback of content segment to inform the user of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer.

The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Individual multimedia content segments of selectably-presentable and interactive video such as that described above can be edited similarly to typical linear video. For example, the audio, video, effects, and other components of a content segment can be edited on a linear timeline that represents the playback progression of the content segment over a fixed period of time. All of the content segments in an interactive video tree, however, cannot be placed on a single, static linear timeline without overwhelming or confusing a user (e.g., a video editor). Because there are various paths that a viewer can take through a video tree, and thus different content segments that can be presented within the same timeframe, a static linear timeline cannot easily or accurately represent the possible progressions of the interactive video.

Figure 2:
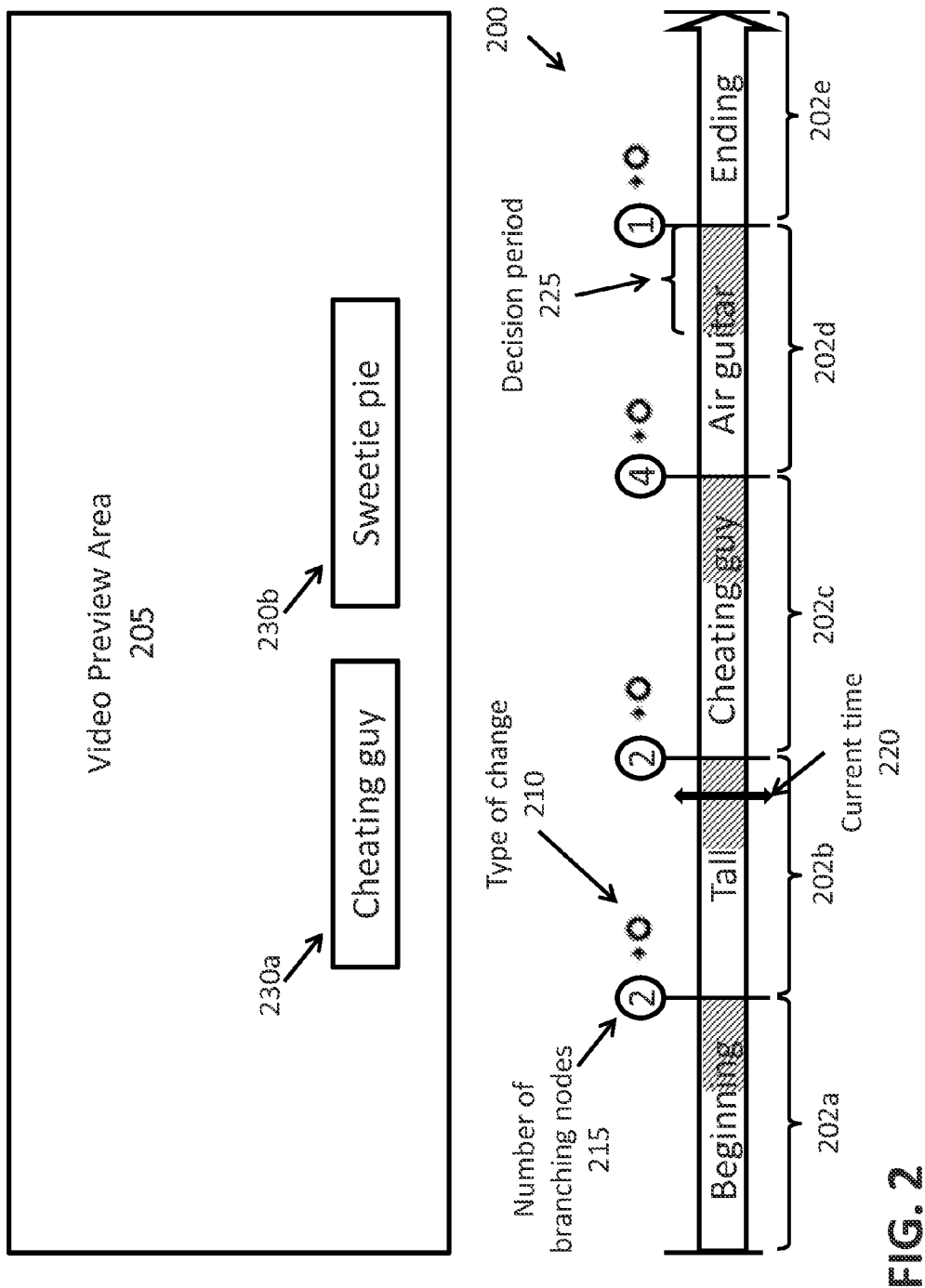
FIG. 2 is a diagram of an example dynamic timeline showing a content path based on the video tree of FIG. 1.

Referring to FIG. 2, in one implementation, a dynamic timeline 200 includes visual representations of the nodes in a video tree in a linear form. The visual representations can include graphical depictions (e.g., bars, lines, or other shapes) of individual video segments along a timeline. The size of a particular bar or other shape on the timeline can represent the playback length of its corresponding video segment relative to other segments on the timeline. To maintain a coherent linear format, only one content path from the video tree is shown at any one time although, in other implementations, multiple paths may be shown (e.g., in parallel or serial). For example, in one implementation, the timeline is expandable to show one or more alternative paths in parallel. The dynamic timeline can also be manipulated by a user to change the particular content path shown in order to individually show and edit the timelines for all possible paths in the video tree.

The dynamic timeline 200 shown in FIG. 2 corresponds to the video tree 100 depicted in FIG. 1. In this particular example, the content path shown in the timeline 200 includes five video segments 202a-202e, which respectively correspond to the path consisting of nodes 102a-102e in the video tree 100. The timeline 200 can include representations of the playback time of the path; for example, the ends of the timeline 200 can display the starting and ending times of the path, and there can be intermediate timestamps or other time indicators (e.g., lines, notches, etc.) that accurately reflect the starting and ending times of individual segments, the playback length of the path, and/or the length of individual segments with respect to each other. For example, where one segment ends and another begins, there can be a divider at the exact time on the timeline 200 where the transition occurs.

The names of the nodes shown in the timeline 200 can be displayed on or around their corresponding visual representations (and/or can appear when selected, when a cursor is hovered over the visual representation, and so on). For example, video segments 202a-202e are respectively titled "Beginning," "Tall," "Cheating guy," Air guitar," and "Ending." In this example, the names of the segments 202a-202e descriptively correspond to objects, events, and/or choices in the video segments (e.g., the video starts, a tall guy cheats and plays air guitar, and the video ends). Each segment shown on the dynamic timeline that has a decision period (e.g., a period of time prior to a branching point during which a viewer can make a choice that will determine the viewer's path in the video tree) can have a visual indicator that delineates the decision period. The decision period can be a portion of a video segment shown on the timeline 200 that is highlighted, colored, or otherwise demarcated, such as decision period 225 of segment 202d.

At and/or around the dividing point between two segments, a visual indicator can identify the number of nodes that branch off and/or are otherwise reachable from the first segment. The visual indicator can be, for example, a circled number, as shown by visual indicator 215. Other graphical and/or textual indicators are contemplated, such as Arabic or Roman numerals with various associated shapes, sizes, and colors, icons, graphs, and the like. The branching node visual indicators can be always shown, or can be toggled, appear when a cursor is hovered over a segment or divider, and so on. Other icons or other graphical/textual indicators, such as visual indicator 210, can also be disposed near the dividing points of segments and can represent the type of change leading to a particular segment (e.g., the segment is a direct child node of the previous segment, the segment is jumped-to from the previous segment (which may or may not be in the same path), the two segments are parallel tracks such that they can be alternated between at any time during playback of the segments, and so on). For example, visual indicator 210 represents a direct parent-child node relationship between video segments 202a and 202b in the timeline. Accordingly, as shown in the video tree 100, there is a direct parent-child relationship between nodes 102a and 102b.

In some implementations, a user can manipulate the dynamic timeline 200 in a manner similar to static linear timelines in existing video editing software. For example, there can be a current position indicator 220 on the timeline 200 that can be dragged or otherwise manipulated by a user along the timeline 200 to navigate the video. The user can also jump to any part of the currently edited path by clicking on the corresponding area of the timeline. The current position indicator 220 can represent a current time, current frame, or other position in the video. Upon manipulating the current position indicator 220, the video frame corresponding to the location of the indicator 220 on the timeline 200 can be displayed in a video preview window 205. The user can also playback all or a portion of the video in the video preview window 205 using standard video player controls (e.g., play, rewind, fast-forward, pause, stop). In some implementations, the user can interact with the video playing in the video preview window 205, including selecting choices during decision periods and following different content paths in the video tree. If the user traverses a different path than that currently shown in the timeline 200, the timeline 200 can dynamically update to reflect the current path, as further described below.

Figure 3A:
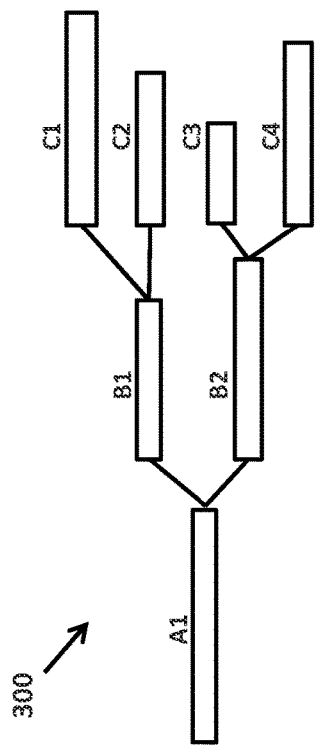
FIG. 3A is a diagram of an example video tree.
Figure 3B:
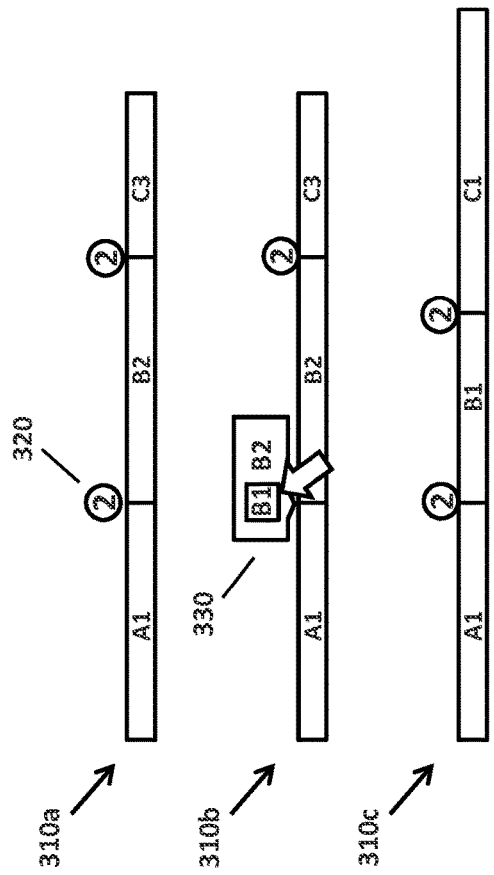
FIG. 3B is a diagram of the states of a dynamic timeline when altering a content path based on the video tree of FIG. 3A.

In one implementation, a dynamic timeline can be altered by a user in order to play or edit a different content path in a video tree. Referring to FIG. 3A, an example video tree 300 has four possible paths ({A1, B1, C1}, {A1, B1, C2}, {A1, B2, C3}, and {A1, B2, C4}). FIG. 3B illustrates the change that occurs in a single dynamic timeline when changing the timeline from a visual representation of one content path in the video tree 300 to a visual representation of a different content path in the video tree 300. Initially, the dynamic timeline 310*a* shows visual representations of the content path including video segments A1, B2, and C3. Segment C3 is the shortest in playback length and is thus proportionally shorter than segments A1 and B2 on the timeline 310*a*.

A user can change the timeline 310*a* to show a different content path (in this example, the path including video segments A1, B1, and C1). In some implementations, the path is changed by selecting a visual indicator 320 that displays the number of branches from the previous segment (e.g., child nodes, jump-to nodes, parallel nodes, etc.). Visual indicator 320 on timeline 410*a* indicates that there are two possible segments that can follow segment A1. Dynamic timeline 310*b* illustrates the interface element 330 that appears upon interaction with visual indicator 320. Interface element 330 displays to the user the different segments that can be reached from segment A1 in the video tree 300 (in this case, segments B1 and B2). Upon selection of a different segment than that currently shown, the dynamic timeline can be updated with the segments from the different content path. Thus, in FIG. 3B, the timeline 310*c*, starting from segment B2, is updated to reflect the user's selection of segment B1. As shown, the visual timeline representation of segment B2 is replaced with segment B1, and segment C3 is replaced with segment C1. Because segments B1 and C1 have different playback lengths than segments B2 and C3, respectively, the timeline 310*c* is also updated to reflect the new lengths. In other implementations, the physical size of the timeline on the screen remains fixed, the scale of the timeline changes, and segments in the timeline are scaled proportionate to one another.

In one implementation, upon selecting one segment to change, the user is prompted to select each subsequent segment to display (if there is more than one possibility for the segment). In another implementation, the child nodes in the video tree 300 have an ordering or priority, and the first child at each branching point is selected for display (e.g., in dynamic timeline 310*c*, segment C1 is displayed rather than segment C2). Other methods for automatically selecting the subsequent nodes in a content path for display in a timeline are possible (e.g., random, last child, highest priority, lowest priority, shortest length, longest length, newest, oldest, previous selection, etc.).

Other methods of changing the content path shown in a timeline are also contemplated. For example, the user can interact with other interface elements, such as the dividers between segments and/or the segments themselves. There can also be controls and/or menus separate from the timeline that allow the user to specify a different content path to be shown. The interaction for switching a particular segment can be, for example, a dropdown menu, a graphical representation of options, a keyboard shortcut, a gesture, and/or other suitable interaction.

In one implementation, an individual segment that is displayed on a dynamic timeline can be edited by selecting the segment, dragging a current position cursor to the segment, or other suitable selection method. Video and/or audio assets can be associated with a segment, or the segment can be defined as a placeholder for video and/or audio not yet defined. The length of the segment can be automatically set based on the playback length of associated video and/or audio and/or, in some instances, can be manually set to a desired length. Connections to other segments can be defined, for example, through an interface on the timeline, by dragging and dropping segments on each other, by drawing lines between nodes (e.g., in a tree-view editor), and/or by other suitable methods. Nodes can be defined in parent/child relationships, as jump-to nodes (in which one node is able to jump to another node in the video tree without necessarily being a direct or indirect child), as parallel track nodes, as looping nodes, or other available node types. Element actions can be associated with the segment; for example, upon user interaction when viewing the segment during playback of the interactive video (and/or autonomously), the segment can allow the user to share the video with social networking connections, open a URL, control playback of the device, and so on. Other properties of a segment can be edited, such as the display name, display thumbnail, and associated notes, and other information about the segment.

In some implementations, by selecting a content segment shown on the timeline, an interactive and/or graphical content layer associated with the segment can be edited. Segments can include an interactive content layer which allows custom controls, text, graphics, timers, and/or other indicators or interactive elements to be associated with the audio/video content in the segment. The elements can be associated with individual segments, or, in some cases, across multiple segments. Elements present on the interactive content layer can be positioned, for example, on video content, a media player, or in other suitable locations. The interactive layer can be superimposed on the video such that the interactive elements are opaque or partially transparent, but the remainder of the layer is completely transparent, allowing the video to be viewed otherwise unobstructed. The interactive layer can be dimensioned equally to the video, or can occupy only a portion thereof. The interactive layer can appear immediately upon playback of the media content associated with a segment, and/or it can appear after a fixed, variable, or random delay.

In some implementations, the interactive layer includes button controls and/or a timer. It is to be appreciated that there are various graphical and textual forms that interactive controls, timers, and other elements can take, such as buttons, switches, dials, sliders, spinners, menus, progress bars, dialogs, popups, tabs, links, ribbons, graphical overlays, and the like. The elements on the interactive layer can be any size or color, and can be positioned anywhere on or around the video display. The elements can be icons, pictures, animations, and/or videos. Text entered by a viewer can appear on the interactive layer with various modifications and/or graphical effects. Elements can be rotoscoped onto the video, composited with the video using green screen or other techniques, superimposed, or otherwise overlaid on the video and can include visual effects such as shadowing, embossing, highlighting, distortion, and other desirable effects.

In some implementations, some elements on the interactive layer are hidden but active, such that a viewer cannot see the elements but can interact with them. In other implementations, some elements are passive, meaning that a viewer is unable to interact with the elements. Passive buttons can be displayed that allow a viewer to see what video path options are available and/or what path options are automatically selected for the viewer. Passive elements can be hidden or visible to the viewer.

Buttons (or other suitable controls) can be added to the interactive layer that allow a viewer to select an option during video playback that corresponds to a path to be followed. A timer can be added to the interactive layer to display the remaining amount of time that a viewer has to select a video path to follow. The timer can be represented as a clock, a bar, and/or any suitable textual and/or graphical representation of time. The timer can toggle between a visible and hidden display, which can be invoked automatically and/or by viewer interaction.

As described above with respect to FIG. 2, a video preview area 205 can play part or all of the interactive video based on the video content structure frame-by-frame or continuously. The video preview area 205 can reproduce the interactive video as it would normally be played on an interactive video player, including the presentation of associated video, audio, and interface elements. In some instances, the interactive video can include seamless connections between content segments such that there are no noticeable interruptions to video or audio playback between segments. Thus, as previously described, the playback in the video preview area 205 can give the user the appearance of watching a continuous multimedia presentation made up of content segments in one or more paths of the video tree.

Figure 4:
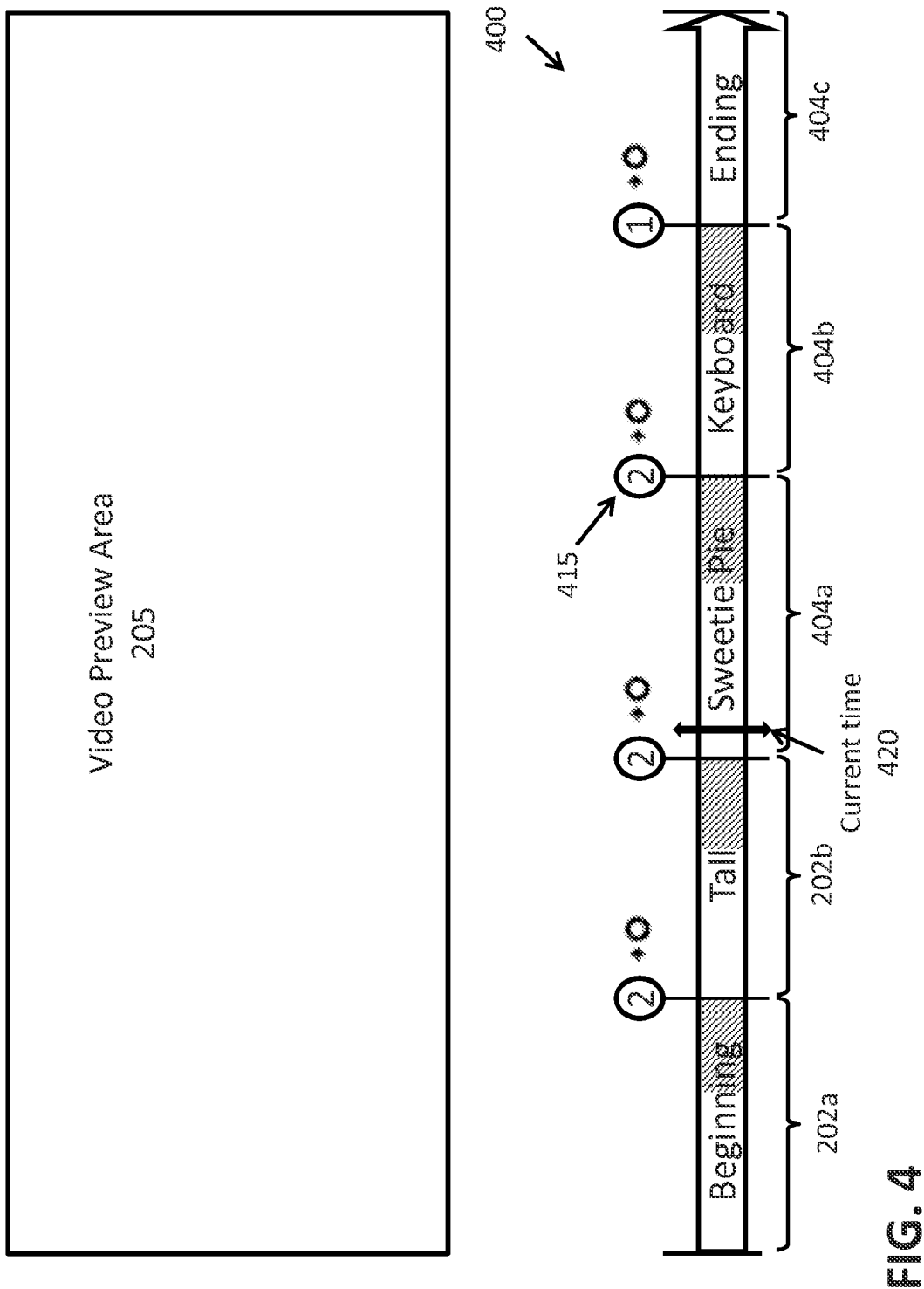
FIG. 4 is a diagram of an example dynamic timeline showing an alternative content path based on the video tree of FIG. 1.

As the video is previewed, the associated dynamic timeline 200 can dynamically update in real-time to reflect the content path followed in the video. For example, on dynamic timeline 200, the current position indicator 220 is in the decision period of video segment 202b. Accordingly, the video in the video preview area 205 provides the user with two choice buttons 230a, 230b respectively associated with the two alternative nodes 102c, 104a in video tree 100 that branch from segment 202b (node 102b in video tree 100). If the user selects option 230b ("Sweetie pie"), the dynamic timeline 200 can be updated to replace video segments 202c, 202d, and 202e (corresponding to nodes 102c, 102d, and 102e in video tree 100, respectively) with the nodes corresponding to the new content path. Thus, as shown in FIG. 4, the dynamic timeline 400 now shows visual representations of alternative content path segments 404a, 404b, and 404c (corresponding to nodes 104a, 104b, and 104c in video tree 100). Further, the current position indicator 420 has entered the chosen segment 404a following segment 202b as playback of the video proceeds. The dynamic timeline 400 can continue to dynamically update as described herein based on the choices made by the user (or choices made automatically) during playback of the interactive video.

In some implementations, a dynamic timeline can behave similarly to a dynamic progress bar during editing and/or preview playback of an interactive video. For example, the timeline can take the form of a tree that is similar to or replicates all or a portion of the video tree structure that the interactive video is based on. The user can toggle the state of the dynamic timeline between a linear form and a tree form and can edit and manipulate the segments/nodes in either form using the techniques described herein. In one implementation, the dynamic timeline can take the form of a dynamic progress bar such as that described in U.S. patent application Ser. No. 13/622,795, filed on Sep. 19, 2012, and entitled, "Progress Bar for Branched Videos," the entirety of which is incorporated by reference herein.

A user can reach a specific segment in the dynamic timeline, whether or not the segment is currently shown on the timeline, in various manners. For example, the user can select an option on the timeline that leads to the desired segment (e.g., select the desired segment from an alternative branch segment menu). The video can also be played until the segment is reached. In other instances, to reach a segment, the user can switch to a tree view of the timeline and select the specific segment and/or browse a list of segments that include all or a subset of the segments in the video tree. The segment can also be added to a list of "recently changed" or "important" segments, automatically and/or by the user.

The techniques described herein can be implemented in any appropriate hardware or software. If implemented as software, the processes can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software downloaded to or existing on a user's device. Some of the functionality can exist remotely; for example, video creation functions can be performed on one or more remote servers. In some implementations, the user's device serves only to provide output and input functionality, with the remainder of the processes being performed remotely.

The local and/or remote software can be implemented on devices such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of a suitable programming languages, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
receiving a video content structure comprising a plurality of video content paths, each video content path comprising a plurality of video content segments, wherein a first one of the video content paths comprises first, second, and third video content segments, and wherein a second one of the video content paths comprises the first video content segment and fourth and fifth video content segments;
providing, for display on a device screen, a visual representation of a dynamic timeline for editing the video content structure, the dynamic timeline comprising visual representations of the first, second, and third video content segments in the first video content path;
receiving an interaction with the visual representation of the dynamic timeline, wherein the interaction is associated with the first video content segment in the first video content path;
in response to the interaction, displaying a user interface element identifying a plurality of alternative video content paths in the video content structure branching from the first video content segment, the alternative video content paths including the second video content path;
receiving a selection in the user interface element identifying the second video content path; and
in response to receiving the selection, updating the visual representation of the dynamic timeline to display visual representations of at least some of the video content segments in the second video content path, wherein updating the visual representation comprises continuing to display the visual representation of the first video content segment while replacing the visual representations of the second and third video content segments with visual representations of the fourth and fifth video content segments.

2. The method of claim 1, wherein the dynamic timeline further comprises at least one visual indicator disposed at a branching point of a video content path.

3. The method of claim 2, wherein the visual indicator identifies a number of alternative video content segments following the branching point.

4. The method of claim 1, wherein the dynamic timeline further comprises at least one visual indicator delineating a decision period in a video content segment.

5. The method of claim 1, further comprising facilitating editing of properties associated with a video content segment displayed in the dynamic timeline.

6. The method of claim 1, further comprising providing a preview of an interactive video based on the video content structure in response to a user interaction with the dynamic timeline.

7. The method of claim 6, further comprising updating the dynamic timeline based on a user interaction with the interactive video preview.

8. A system comprising:
one or more computers programmed to perform operations comprising:
receiving a video content structure comprising a plurality of video content paths, each video content path comprising a plurality of video content segments, wherein a first one of the video content paths comprises first, second, and third video content segments, and wherein a second one of the video content paths comprises the first video content segment and fourth and fifth video content segments;
providing, for display on a device screen, a visual representation of a dynamic timeline for editing the video content structure, the dynamic timeline comprising visual representations of the first, second, and third video content segments in the first video content path;
receiving an interaction with the visual representation of the dynamic timeline, wherein the interaction is associated with the first video content segment in the first video content path;
in response to the interaction, displaying a user interface element identifying a plurality of alternative video content paths in the video content structure branching from the first video content segment, the alternative video content paths including the second video content path;
receiving a selection in the user interface element identifying the second video content path; and
in response to receiving the selection, updating the visual representation of the dynamic timeline to display visual representations of at least some of the video content segments in the second video content path, wherein updating the visual representation comprises continuing to display the visual representation of the first video content segment while replacing the visual representations of the second and third video content segments with visual representations of the fourth and fifth video content segments.

9. The system of claim 8, wherein the dynamic timeline further comprises at least one visual indicator disposed at a branching point of a video content path.

10. The system of claim 9, wherein the visual indicator identifies a number of alternative video content segments following the branching point.

11. The system of claim 8, wherein the dynamic timeline further comprises at least one visual indicator delineating a decision period in a video content segment.

12. The system of claim 8, wherein the operations further comprise facilitating editing of properties associated with a video content segment displayed in the dynamic timeline.

13. The system of claim 8, wherein the operations further comprise providing a preview of an interactive video based on the video content structure in response to a user interaction with the dynamic timeline.

14. The system of claim 13, wherein the operations further comprise updating the dynamic timeline based on a user interaction with the interactive video preview.

15. The method of claim 1, further comprising:
at a later time, receiving a second selection in the user interface element identifying the first video content path; and
in response to receiving the second selection, continuing to display the visual representation of the first video content segment while replacing the visual representations of the fourth and fifth video content segments with visual representations of the second and third video content segments.

16. The system of claim 8, wherein the operations further comprise:
at a later time, receiving a second selection in the user interface element identifying the first video content path; and
in response to receiving the second selection, continuing to display the visual representation of the first video content segment while replacing the visual representations of the fourth and fifth video content segments with visual representations of the second and third video content segments.

* * * * *